United States Patent [19]

Tomita

[11] Patent Number: 4,532,565
[45] Date of Patent: Jul. 30, 1985

[54] TAPE RECORDER

[75] Inventor: Seiji Tomita, Yokosuka, Japan

[73] Assignee: Tokyo Shibaura Denki Kabushiki Kaisha, Kawasaki, Japan

[21] Appl. No.: 383,216

[22] Filed: May 28, 1982

[30] Foreign Application Priority Data

May 29, 1981 [JP] Japan ................................. 56-82104

[51] Int. Cl.³ .......................... G11B 5/55; G11B 21/00
[52] U.S. Cl. ..................................... 360/106; 360/129
[58] Field of Search ....................... 360/104, 106, 129

[56] References Cited

U.S. PATENT DOCUMENTS

| 2,711,445 | 6/1955 | Steinegger | 360/118 X |
| 3,614,342 | 10/1971 | Siebert | 360/78 |
| 3,777,070 | 12/1973 | Bumb | 360/103.21 X |
| 3,855,628 | 12/1974 | Bachmann | 360/106 |
| 3,882,543 | 5/1975 | Richards | 360/109 |
| 3,969,770 | 7/1976 | Cavallari | 360/121 |
| 4,238,808 | 12/1980 | Tomita | 360/74.2 |
| 4,302,788 | 11/1981 | Yamamoto | 360/96.6 |

FOREIGN PATENT DOCUMENTS

| 1209763 | 1/1966 | Fed. Rep. of Germany . |
| 1805037 | 6/1969 | Fed. Rep. of Germany . |
| 1474295 | 10/1969 | Fed. Rep. of Germany . |
| 1622861 | 3/1971 | Fed. Rep. of Germany . |
| 2414538 | 10/1974 | Fed. Rep. of Germany . |
| 2348493 | 4/1975 | Fed. Rep. of Germany . |
| 48-24531 | 7/1973 | Japan . |
| 49-24412 | 7/1974 | Japan . |
| 2086642 | 5/1982 | United Kingdom . |

Primary Examiner—George G. Stellar
Attorney, Agent, or Firm—Cushman, Darby and Cushman

[57] ABSTRACT

The present invention relates to a tape recorder and, more particularly, to a tape recorder having an automatic reverse function. The tape recorder has selecting means, a head and a head rotating mechanism. When control buttons are operated by a user, the selecting means can select one of the forward and reverse tape transport directions, and the head rotating mechanism can rotate the head to one of the two positions corresponding to the forward and reverse tape transport directions in accordance with a selection by said selecting means, tape contact surface facing the tape.

6 Claims, 30 Drawing Figures

F I G. 2
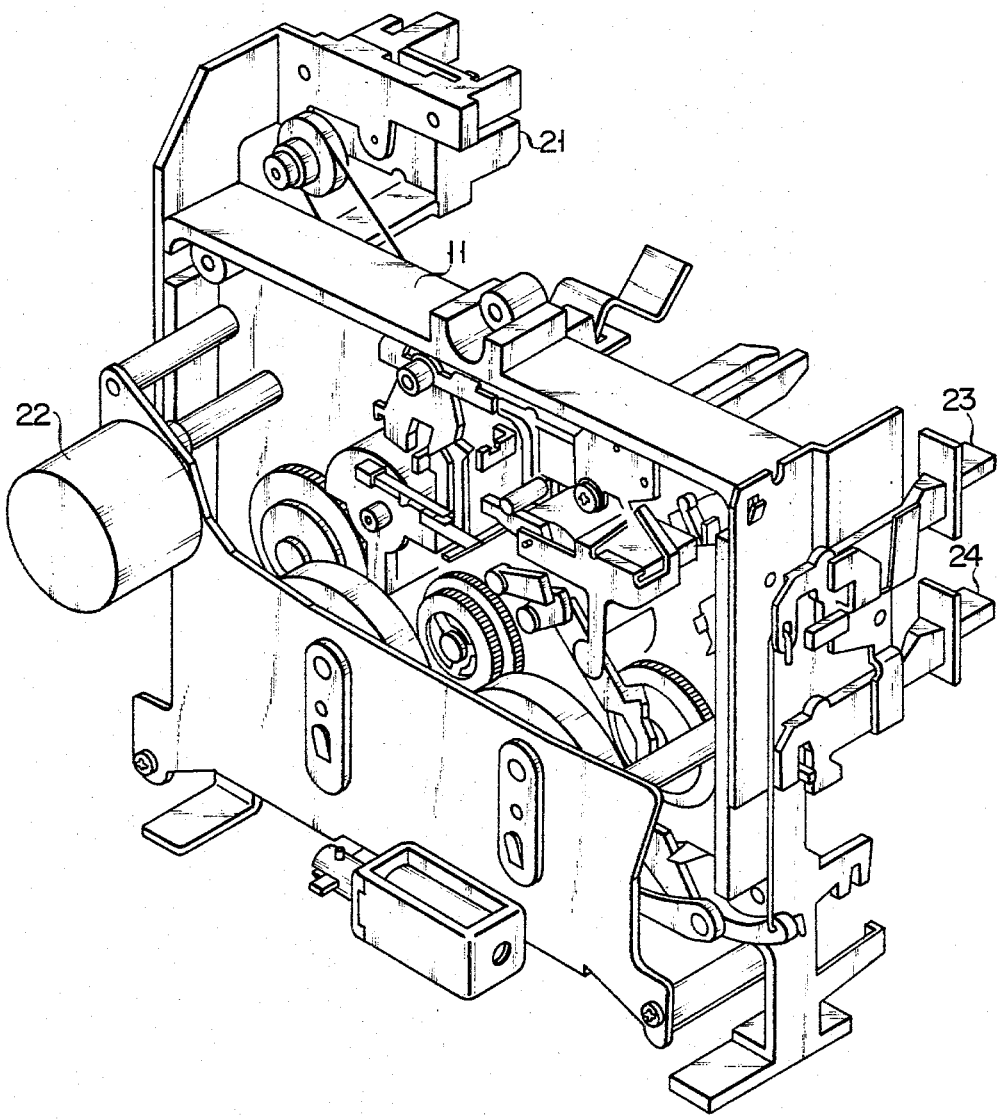

F I G. 6C
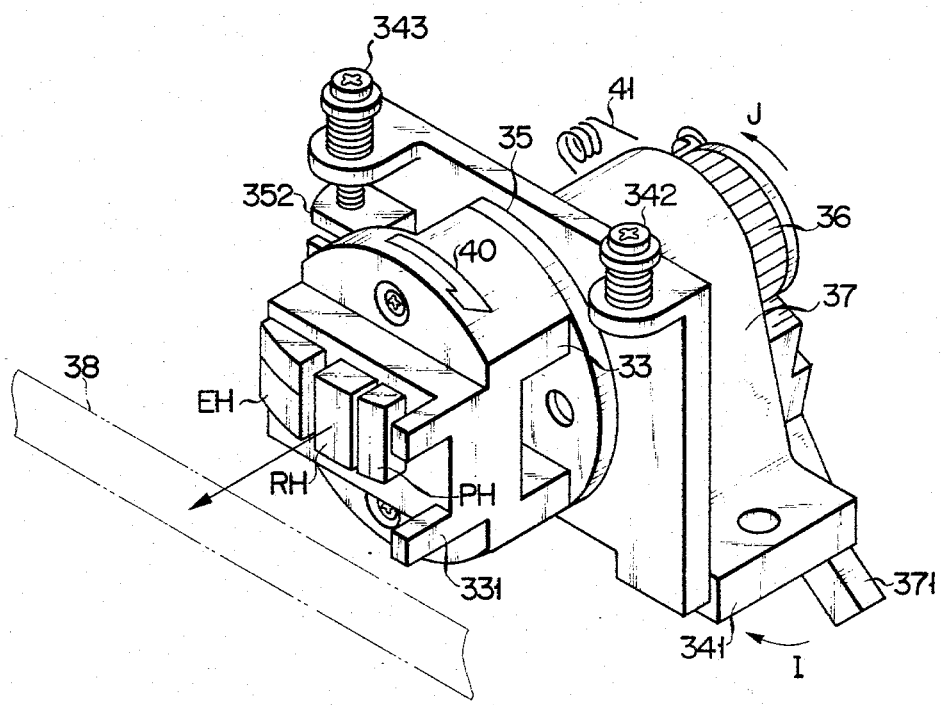

F I G. 10A
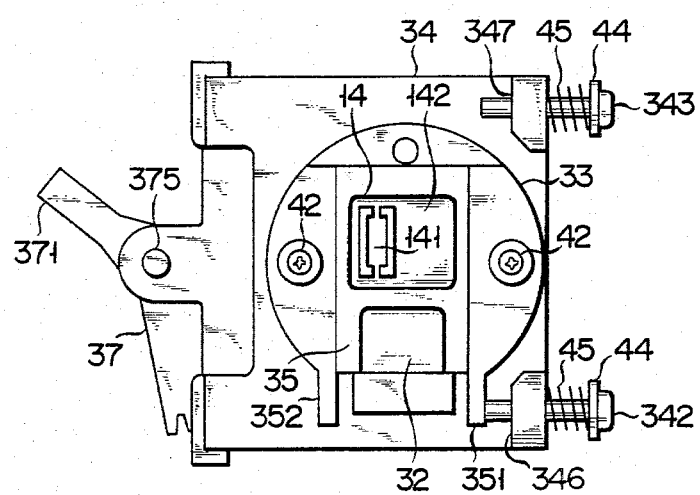
F I G. 10B
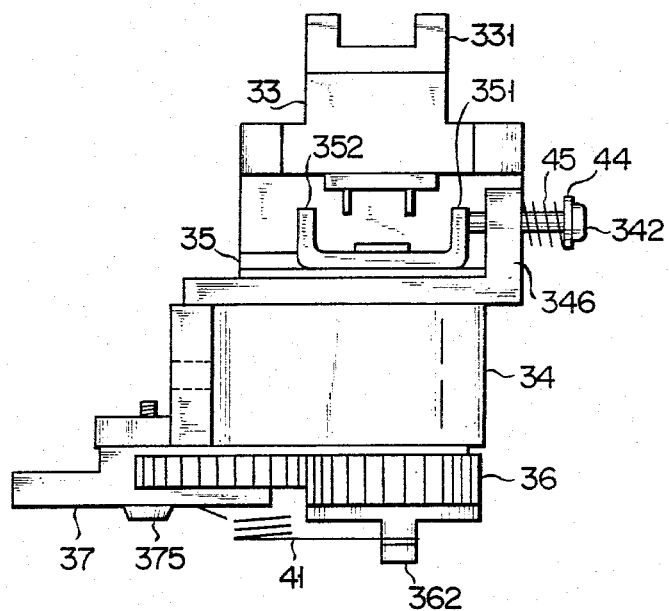

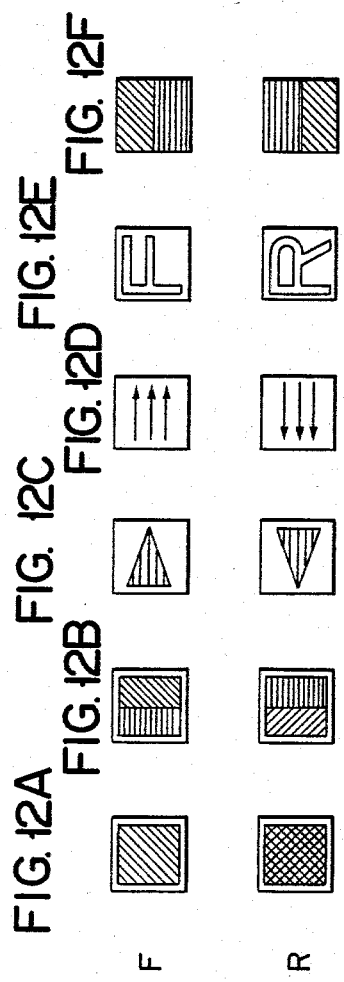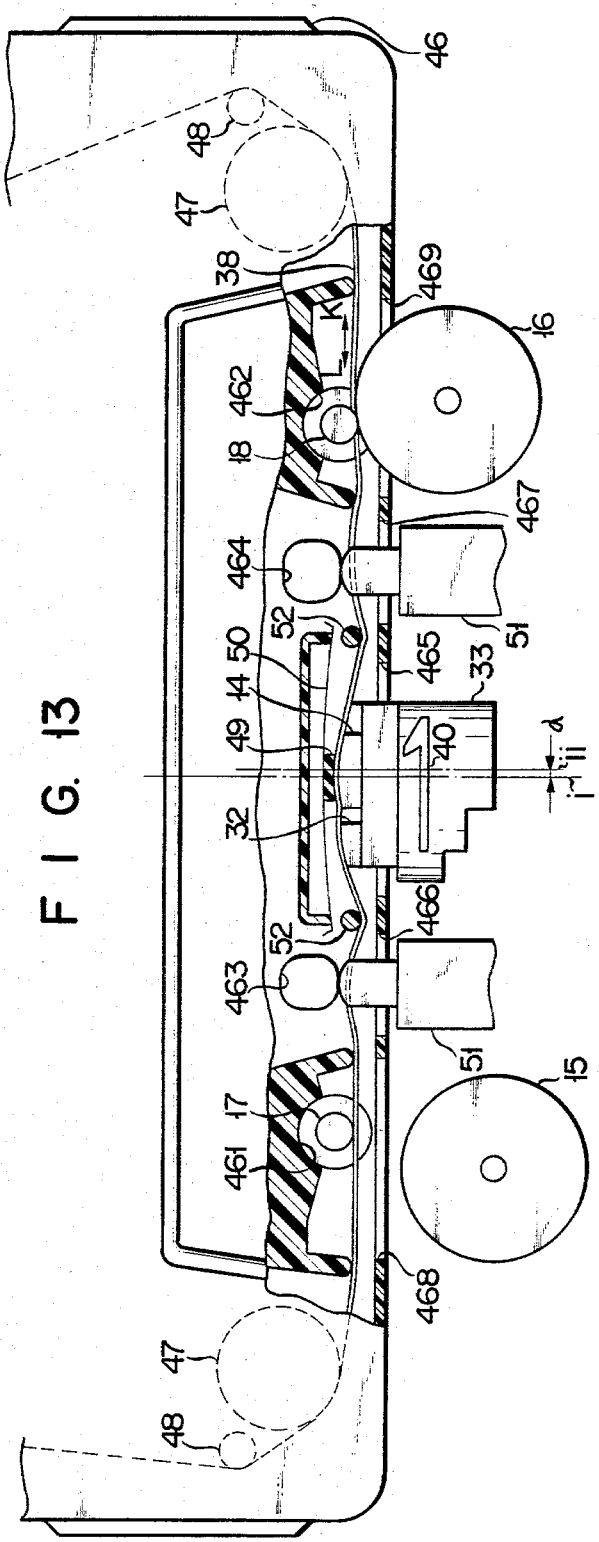

TAPE RECORDER

BACKGROUND OF THE INVENTION

The present invention relates to a tape recorder and, more particularly, to a tape recorder having an automatic reverse function.

A known mechanism for recording and playing back signals on and from a magnetic tape in the forward and reverse directions is called an automatic reverse mechanism. The user need not change the side of the tape and the current operation mode when the tape reaches its terminal end in the forward record or play mode. Recording or playback is automatically performed also in the reverse direction. Therefore, if the user wishes to record or play back the tape over a long period of time, he can conveniently use the automatic reverse mechanism.

In the automatic reverse mechanism of this type, a record/play head must come in contact with a corresponding track of the tape at a predetermined azimuth in the forward or reverse tape transport direction to obtain optimal results. For this purpose, the record/play head must be rotated properly in accordance with the forward and reverse operation modes. In general, the head is rotated substantially perpendicularly to the longitudinal direction of the tape by a switching means for a head. Therefore, a sufficiently large space must be provided to allow rotation of the head in the tape recorder mechanisms and the tape recorder becomes large in size.

In order to solve the above problem, conventionally, the head is rotated, while its surface in contact with the tape (to be referred to as a tape contact surface hereinafter) faces the tape. Thus, an excessive space is eliminated. However, the head rotating means of this type must be further improved. It is strongly desired that various improvements in structure, assembly, and loss characteristic in recording and playback signals of the tape be made in accordance with user's needs.

SUMMARY OF THE INVENTION

The present invention has been made in consideration of this and has for its object to provide a compact tape recorder of simple construction for easy assembly wherein a head is systematically and effectively moved to a position corresponding to a tape transport direction when forward and reverse operation modes are switched.

According to one aspect of the present invention, there is provided a tape recorder comprising: selecting means for selecting one of the forward and reverse tape transport directions; a head having a tape contact surface; and a head rotating mechanism for rotating said head to one of the two positions corresponding to the forward and reverse tape transport directions in accordance with a selection by said selecting means, said tape contact surface facing the tape.

BRIEF DESCRIPTION OF THE DRAWINGS

FIGS. 1 and 2 are schematic perspective views of a tape recorder according to one embodiment of the present invention, respectively;

FIGS. 6A to 6C are respectively a schematic perspective view of a head rotating mechanism, a perspective view for explaining the mode of operation thereof, and a perspective view thereof when a record head is separated from a play head;

FIGS. 10A and 10B and FIGS. 11A and 11B are views of the head rotating mechanism when viewed at various angles, respectively;

FIGS. 12A to FIG. 12F are partial views of a tape transport direction indicator disposed in the head rotating mechanism;

FIG. 13 is a view illustrating the mounting condition of the head relative to a cassette half;

DETAILED DESCRIPTION OF THE PREFERRED EMBODIMENTS

A tape recorder according to one embodiment of the present invention will be described hereinafter with reference to the accompanying drawings.

Figure 1:
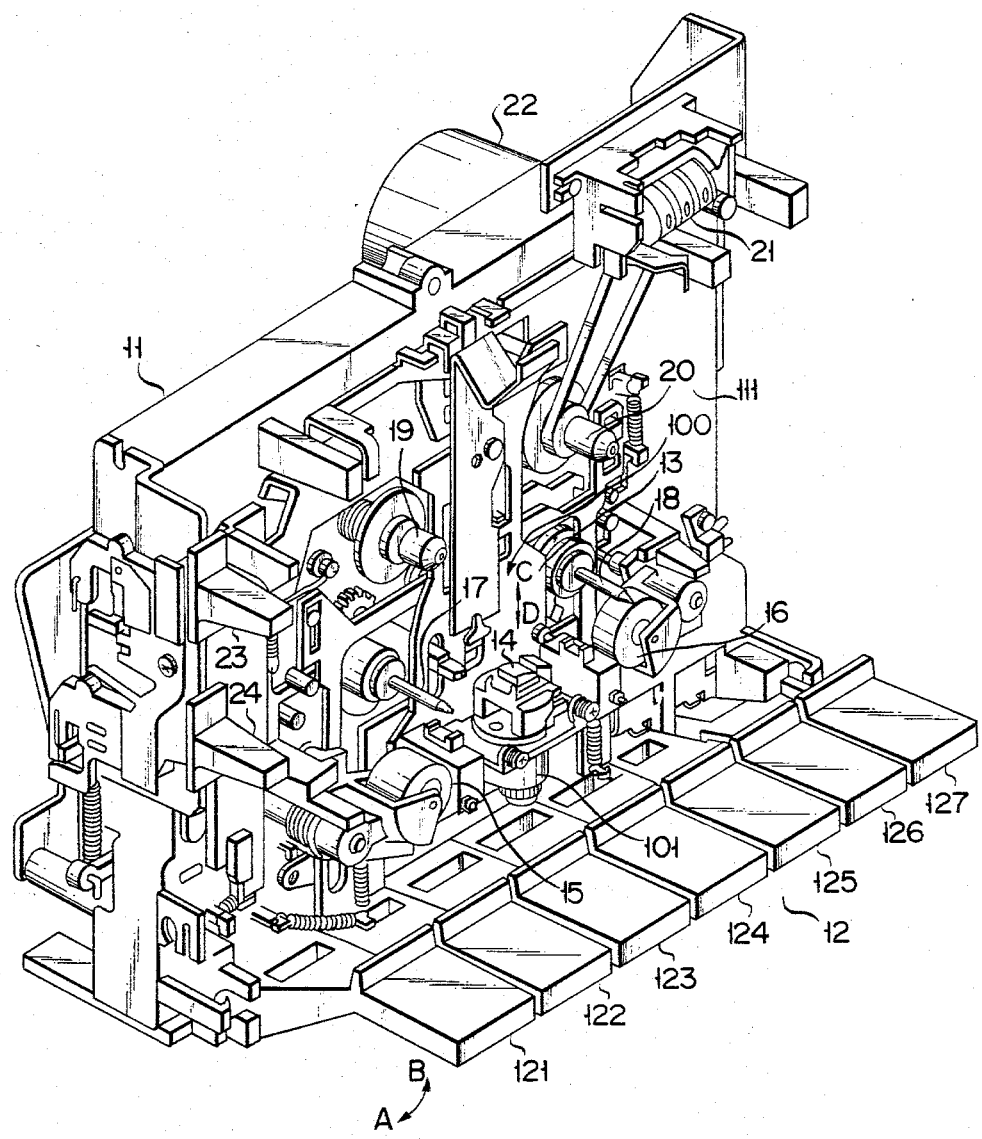

Referring to FIGS. 1 and 2, reference numeral 11 denotes a substantially box-shaped main chassis of a compact cassette tape recorder. Various mechanisms are mounted on front and back portions, upper and lower portions and right and left portions of the main chassis 11. A control section 12 extends toward the front from the lower end of the main chassis 11, as shown in FIG. 1. The control section 12 has a STOP button 121 which also functions as an EJECT button, a REW button 122 for rewinding the tape, a PLAY (R) button 123 for playing back the tape in the reverse direction, a REC button 124 for recording signals on the tape, a PLAY (F) button 125 for playing back the tape in the forward direction, an FF button 126 for fast forwarding the tape, a PAUSE button 127 for temporarily stopping the tape in the order named when viewed from the left in FIG. 1. The user can press these buttons 121 to 127 with piano touch in the direction indicated by arrow A to drive drive mechanisms through control levers (not shown), respectively. These buttons 121 to 127 can be returned to the original positions as indicated by arrow B. When the user presses one of the buttons 121 to 127, the control lever which is vertically reciprocally slidable on the rear side of a flat surface 111 of the main chassis 11 in FIG. 1 is engaged with a known locking mechanism (not shown) and is locked thereby. However, the control lever of the STOP button 121 cannot be locked by the locking mechanism. This lever is engaged with the locking mechanism to release the locking condition of other control levers of other buttons 122 to 127. The control lever of the PAUSE button 127 operates independently of the locking mechanism. This control lever is engaged with a known push-push mechanism (not shown) disposed at the rear side of the flat surface 111 of the main chassis 11. When the user first presses the PAUSE button 127, it is locked to temporarily stop the playback mode or the like. When he presses it again, the locking condition of the PAUSE button 127 is released to initiate the playback mode or the like.

The control lever of the REW or FF button 122 or 126 selectively drives a forward/reverse switching mechanism (not shown) for the high speed drive system. Therefore, the tape is driven at a high speed in the forward or reverse direction. The control lever of the PLAY (R) or PLAY (F) button 123 or 124 selectively drives a forward/reverse switching mechanism 100 for the normal speed drive system. Therefore, the tape is driven at the normal speed in the forward or reverse direction. The levers of the PLAY (R) and PLAY (F) buttons 123 and 124 drive a head slider 13 which is reciprocally slidable in the direction indicated by arrows C and D in FIG. 1. A record/play head 14 mounted on the head slider 13 then comes into contact with a predetermined surface of the tape. Simultaneously, a pinch roller 15 or 16 comes in contact with a capstan 17 or 18. Playback is then performed in the forward or reverse direction. The record/play head 14 is moved to have a proper azimuth in the forward or reverse tape transport direction by a head moving mechanism 101 and comes in contact with a corresponding track of the tape properly. The arrangement and the mode of operation of the head moving mechanism 101 will be described in detail later.

In a normal tape recorder, only a single PLAY button is used to reproduce the signals from the tape in the forward direction. However, in a tape recorder having an automatic reverse function under discussion recording and playback must be performed in both of forward and reverse directions. Therefore, two independent PLAY buttons are required for the forward and reverse modes, respectively. When the user presses one of the PLAY buttons, the tape is driven in the specified direction. When he presses two PLAY buttons simultaneously, the automatic reverse function is initiated. If he wishes to play back the tape in the forward direction, he only presses the PLAY (F) button.

When the user wishes to drive the tape in one tape transport direction and record it, he must press the REC button 124 and the PLAY (R) or PLAY (F) button 123 or 125 simultaneously to drive the tape in a desired direction for recording. Further, when the user wishes to record the tape in the automatic reverse mode, he presses the REC button 124 and the PLAY (R) and PLAY (F) buttons 123 and 125 simultaneously. Thus, the recording system is operated.

Referring to FIG. 1, right and left reel tables 20 and 19 extend at the center of the main chassis 11. These tables are connected to an automatic stop mechanism for automatically stopping the tape when the tape reaches its initial or terminal end and to the forward/reverse switching mechanisms. In the upper portion of the main chassis 11 in FIG. 1 are arranged a tape counter 21 connected to the right reel table 20, a motor 22 for driving drive mechanisms, a mechanism for determining the number of times of reciprocal movements, and control levers 23 and 24 of a manual reverse mechanism used for reversing the tape transport direction at an arbitrary position determined by the user.

Figure 3:
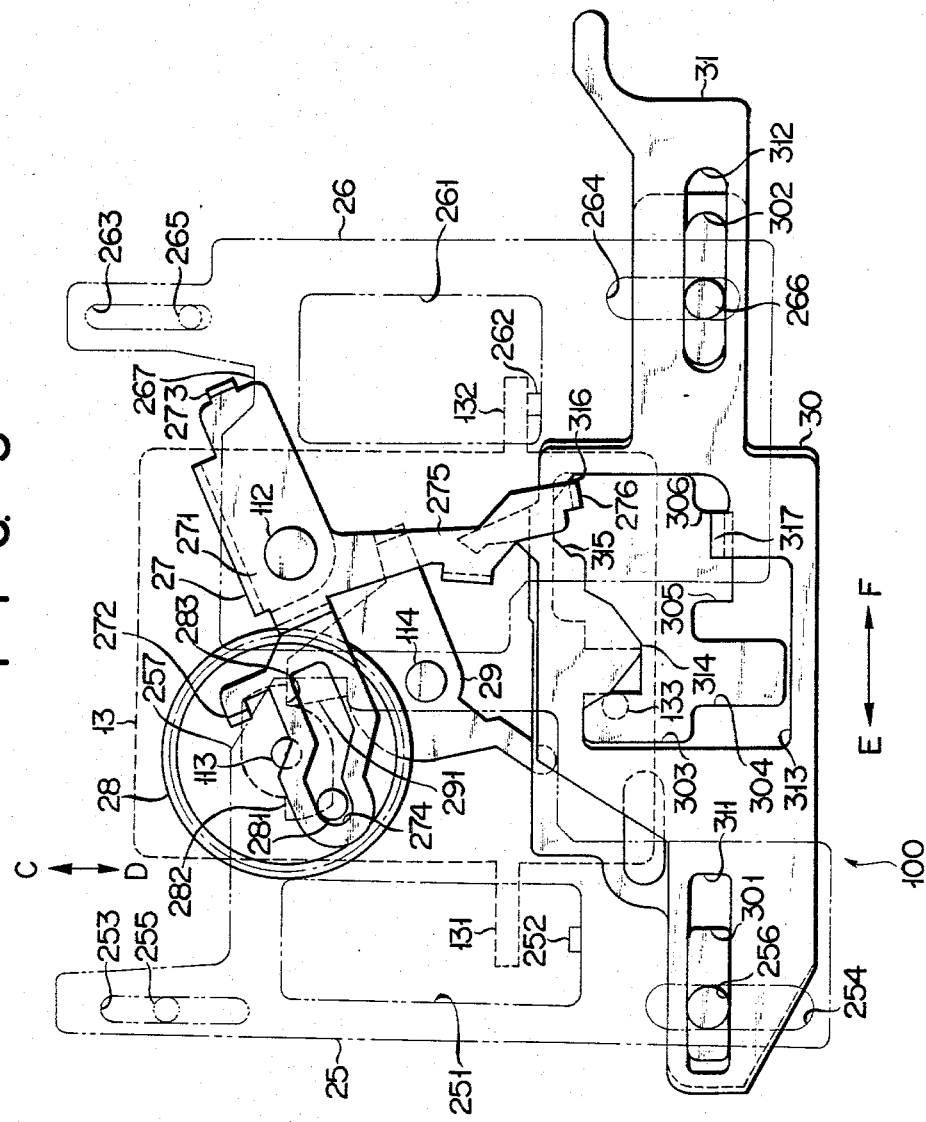
FIG. 3 is a plan view of a forward/reverse switching mechanism for a tape in the tape recorder shown in FIGS. 1 and 2.

FIG. 3 shows the forward/reverse switching mechanism 100 of the normal speed drive system shown in FIGS. 1 and 2. The head slider 13 shown in FIG. 1 is illustrated in a simplified manner for illustrative convenience, as indicated by the broken line. A pair of projections 131 and 132 are formed at predetermined positions of both sides of the head slider 13. The projections 131 and 132 of the head slider 13 are engaged with engaging portions 252 and 262 formed at the lower portions (viewed in the figure) of through holes 251 and 261, respectively. The through holes 251 and 261 are formed substantially at the centers of left and right playback sliders 25 and 26, respectively shown by the alternate long and two short dashed line in the FIG. 3 aligned on the rear surface of the head slider 13. The right and left playback sliders 26 and 25 have elongate holes 263 and 264 and elongate holes 253 and 254, respectively. These elongate holes 253 and 254 are engaged with guide pins 255 and 256 formed on the main chassis 11, while the elongate holes 263 and 264 are engaged with guide pins 265 and 266 formed thereon. The right and left playback sliders 26 and 25 are supported in the same manner as the head slider 13 to be reciprocally slidable in the direction indicated by arrows C and D.

The right and left playback sliders 26 and 25 operate in cooperation with the control levers of the PLAY (F) and PLAY (R) buttons 125 and 123 through springs (not shown), respectively. When the user presses the PLAY (F) and PLAY (R) buttons 125 and 123, the right and left playback sliders 26 and 25 are biased in the direction indicated by arrow C, respectively. The right playback slider 26 and the left playback slider 25 control the pinch rollers 16 and 15, respectively. Simultaneously, the playback sliders 26 and 25 control idlers (not shown), gears (not shown) and the like which transmit the rotational force of the motor 22 to the right and left reel tables 20 and 19, respectively. When the left playback slider 25 is slid in the direction indicated by arrow C, the pinch roller 15 comes in tight contact with the capstan 17 (FIG. 1) and the left reel table 19 is driven to take up the tape. Thus, the tape is played back in the reverse direction. Similarly, when the right playback slider 26 is slid in the direction indicated by arrow C, the pinch roller 16 comes in tight contact with the capstan 18 (FIG. 1) and the right reel table 20 is driven to take up the tape. Thus, the tape is played back in the forward direction. The forward or reverse tape transport direction is determined by movement of the right or left playback slider 26 or 25 in the direction indicated by arrow C in FIG. 3.

A tapered stopper 257 is formed at the upper right side of the left playback slider 25. A stopper 267 having a substantially concave-shaped notch is formed substantially at the upper center of the right playback slider 26. Under the right and left playback sliders 26 and 25, a substantially T-shaped reverse drive lever 27 is rotatably supported on a shaft 112 projecting from the main chassis 11. A bending portion 272 which engages with the stopper 257 of the left playback slider 25 is formed to the left of a proximal portion 271 of the reverse drive lever 27. A bending portion 273 which engages with the stopper 267 is formed to the right of the proximal portion 271 of the reverse drive lever 27. Further, a substantially crank-shaped elongate hole 274 is formed to the left of the proximal portion 271 of the reverse drive lever 27.

A projection 281 extending from one side surface of a gear 28 rotatably supported by a shaft 113 projecting from the main chassis 11 is fitted in the elongate hole 274 of the reverse drive lever 27. Therefore, when the gear 28 is rotated, the reverse drive lever 27 pivots about the shaft 112. A pair of stoppers 282 and 283 which can be engaged with a locking lever 29 to be described later are formed on a side of the gear 28 opposite to the side thereof from which the projection 281 extends. The stoppers 282 and 283 oppose each other about the center of the shaft 113. The locking lever 29 is rotatably supported on a shaft 114 disposed on the main chassis 11. The locking lever 29 has an engaging portion 291 which is selectively engageable with the stoppers 282 and 283 of the gear 28. The locking lever 29 is biased in a direction in which the engaging portion 291 is normally engaged with the stoppers 282 and 283 of the gear 28, that is, in the counterclockwise direction in FIG. 3 by the biasing force of a spring (not shown). However, the locking lever 29 is pivoted against the biasing force of the spring in the clockwise direction in FIG. 3 when the tape terminal end is detected in the forward/reverse switching mode and when the user operates the control lever 24 (FIG. 1) of the manual reverse mechanism. Therefore, the locking lever 29 causes the engaging portion 291 to be released from the stoppers 282 and 283 of the gear 28.

A first gear (not shown) always meshes with the gear 28. The gear ratio of the first gear to the gear 28 is 1:2. When the first gear is revolved once, the gear 28 is rotated half the revolution. A notched portion is formed at a predetermined portion of the first gear. Independently of the tape travel, a second gear which is rotated in one direction by the rotational force of the motor 22 is disposed at a position to oppose the notched portion. The second gear meshes with the first gear and is driven to rotate the gear 28 in the clockwise direction.

With the forward/reverse mechanism 100 of the above arrangement, assume that the user presses the PLAY (F) and PLAY (R) buttons 125 and 123 simultaneously to initiate the automatic reverse mode. The right and left playback sliders 26 and 25 are slid in the direction indicated by arrow C in FIG. 3 altogether through the control levers and springs which operate incorporation with the buttons 125 and 123. If the engaging portion 291 of the locking lever 29 is engaged with the stopper 283 of the gear 28 as shown in FIG. 3, the position of the reverse drive lever 27 is regulated by the projection 281. Therefore, the right playback slider 26 is sufficiently moved to the direction indicated by arrow C. However, the stopper 257 of the left playback slider 25 abuts against the bending portion 272 of the reverse drive lever 27. The left playback slider 25 is not moved sufficiently to the direction indicated by arrow C. Therefore, the pinch roller 16 and the idler controlled by the right playback slider 26 come in tight contact with the capstan 18 and are moved to a predetermined position to rotate the right reel table 20. Thus, the tape is played back in the forward direction. Along with the movement of the right playback slider 26 in the direction indicated by arrow C, the engaging portion 262 comes in contact with the projection 132 of the head slider 13. The head slider 13 is then moved in the direction indicated by arrow C. The record/play head 14 (FIG. 1) to be described in detail later and disposed on the head slider 13 comes in contact with the tape. Simultaneously, since the reverse drive lever 27 stops the left playback slider 25 which is biased in the direction indicated by arrow C, the force is applied to the reverse drive lever 27 in the clockwise direction. The gear 28 which has the projection 281 fitted in the elongate hole 274 of the reverse drive lever 27 is rotatably biased in the clockwise direction. However, since the stopper 283 of the gear 28 is engaged with the engaging portion 291 of the locking lever 29, the gear 28 is not rotated and the reverse drive lever 27 is kept in a position shown in FIG. 3.

Figure 4:
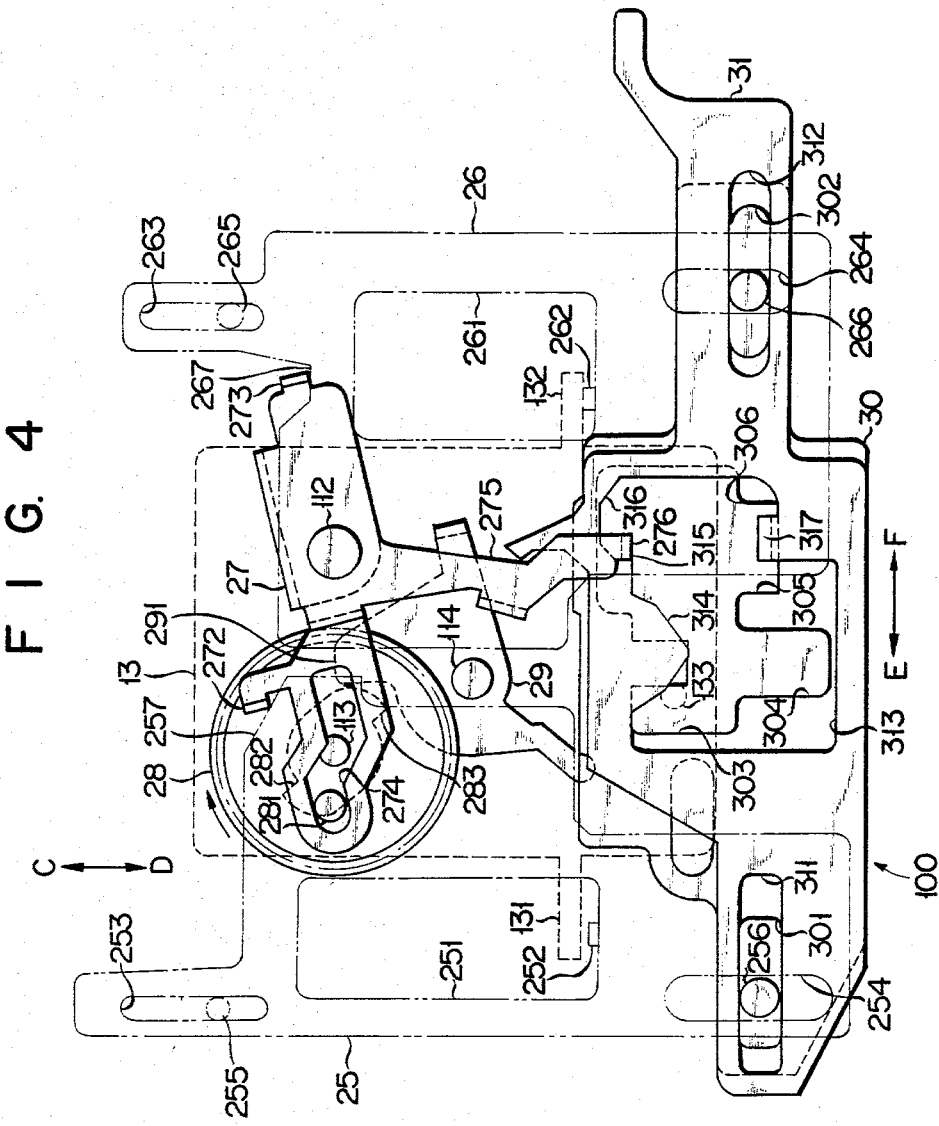
FIGS. 4 and 5 are plan views for explaining the mode of operation of the forward/reverse switching mechanism, respectively.

Assume that the tape reaches its terminal end in the forward playback mode described above. The locking lever 29 is pivoted in the clockwise direction by the tape end detecting mechanism, as shown in FIG. 4. The engaging portion 291 of the locking lever 29 is released from the stopper 283 of the gear 28. As described above, since the biasing force is applied to the gear 28 in the clockwise direction as shown in FIG. 3, the gear 28 is slightly rotated in the clockwise direction, as shown in FIG. 4. The first gear meshed with the gear 28 is slightly rotated in the counterclockwise direction. The first gear then meshes with the second gear, so that the gear 28 is rotated in the clockwise direction by the rotating force of the second gear.

Figure 5:
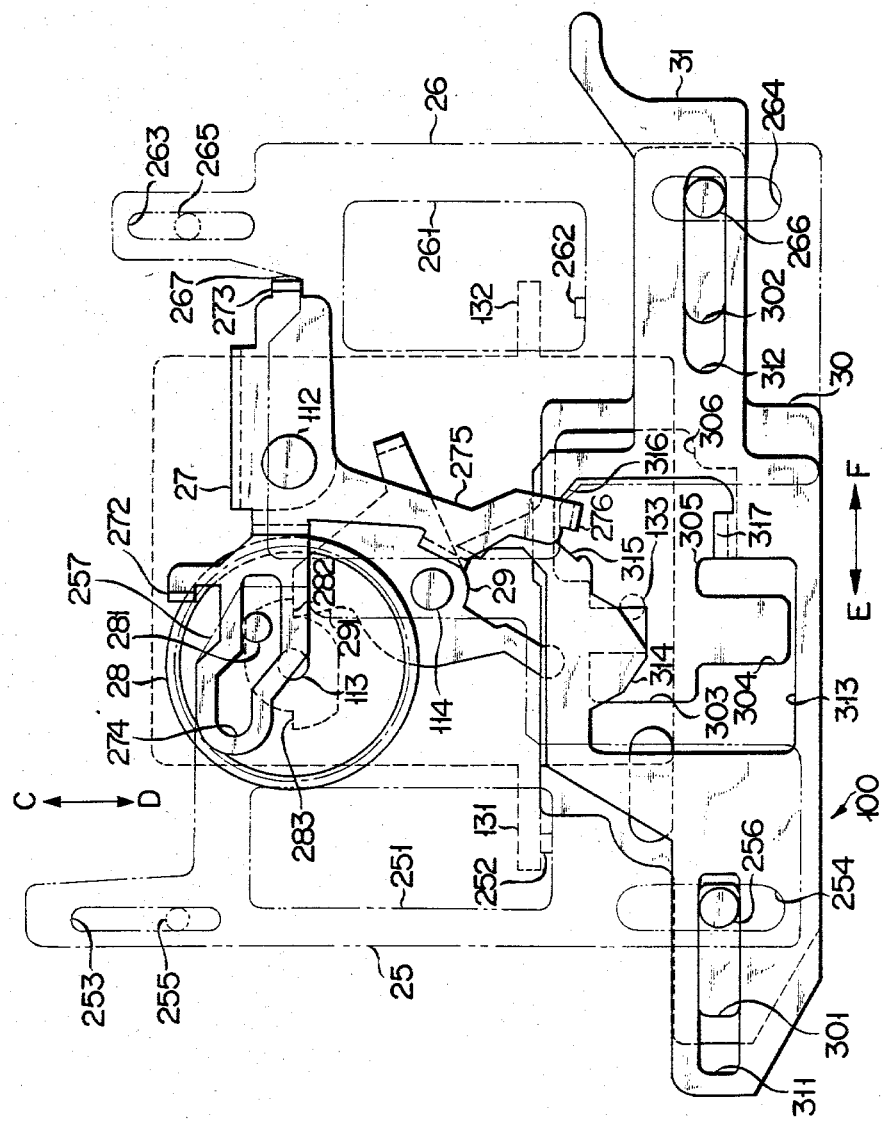

When the first gear is revolved once and its notched portion opposes the second gear, the gear 28 is pivoted half the revoltion as shown in FIG. 5. The stopper 282 of the gear 28 abuts against the engaging portion 291 of the locking lever 29. When the gear 28 is pivoted by half the revolution, the reverse drive lever 27 is pivoted in the clockwise direction as shown in FIG. 5, following the movement of the projection 281. The bending portion 273 of the reverse drive lever 27 comes in contact with the stopper 267 of the right playback slider 26, so that the right playback slider 26 is moved backward in the direction indicated by arrow D. However, the stopper 257 of the left playback slider 25 is disengaged from the bending portion 272 of the reverse drive lever 27, so that the left playback slider 25 is sufficiently moved in the direction indicated by arrow C. The pinch roller 15 and the idler controlled by the left playback slider 25 come in tight contact with the capstan 17 and are moved to a predetermined position to rotate the left reel table 19. Thus, the tape is played back in the reverse direction. Along with the movement of the left playback slider 25 in the direction indicated by arrow C, the engaging portion 252 of the left playback slider 25 abuts against the projection 131 of the head slider 13 to move the head slider 13 in the direction indicated by arrow C. The record/play head 14 disposed on the head slider 13 then comes in contact with the tape.

The head slider 13 is moved backward in the direction indicated by arrow D when the tape transport direction is changed from the forward direction to the reverse direction or from the reverse direction to the forward direction by a mechanism to be described later. Thereafter, along with the movement of the right or left playback slider 26 or 25 in the direction indicated by arrow C, the head slider 13 is moved in the forward or backward direction.

Referring to FIG. 5, since the right playback slider 26 biased in the direction indicated by arrow C is stopped by the reverse drive lever 27, the force acts on the reverse drive lever 27 in the counterclockwise direction. The force thus acts on the gear 28 in the clockwise direction. However, since the stopper 282 of the gear 28 is engaged with the engaging portion 291 of the locking lever 29, the gear 28 is not rotated and the reverse drive lever 27 is kept at a position indicated in FIG. 5.

When the tape reaches its initial end in the reverse playback mode described above, the locking lever 29 is pivoted in the clockwise direction by the tape end detecting mechanism. The gear 28 is pivoted by half the revolution in the clockwise direction. The tape is played back in the forward direction as shown in FIG. 3. As is apparent from the above description, the forward/reverse switching mechanism for the tape is not only driven at the terminal end of the tape but also driven when the control lever 24 of the manual reverse mechanism is operated. The tape transport direction can be arbitrarily changed at desired time.

The forward/reverse switching mechanism 100 for the tape transport direction has been described above. The head moving mechanism 101 (FIG. 1) will be described below. A bending portion 276 is formed at the top of a stem 275 of a substantially T-shaped reverse drive lever 27. The guide pins 256 and 266 are fitted in the elongate holes 254 and 264 of the left and right playback sliders 25 and 26, respectively. The guide pins 256 and 266 are further fitted in elongate holes 301 and 302 and elongate holes 311 and 312 which are respectively formed at both ends of a control slider 30 and a drive slider 31 between the main chassis 11 and the left and right sliders 25 and 26. These sliders 30 and 31 overlap with each other and are supported to be reciprocally slidable in a direction perpendicular to a sliding direction of the right and left playback sliders 26 and 25, that is, in the direction indicated by arrows E and F.

A through hole 303 is formed substantially at the center of the control slider 30. A fitting portion 304 of a substantially concave-shaped recess is formed at the lower portion of the through hole 303. A driven portion of a sector-shaped gear disposed in the head rotating mechanism to be described later is fitted in the fitting portion 304. A pair of stoppers 305 and 306 are spaced apart at equal intervals along the longitudinal direction of the control slider 30 and are formed to the right of the fitting portion 304 of the through hole 303.

A through hole 313 is formed substantially at the center of the drive slider 31. A tapered projection 314 of a substantially conical shape is formed at the upper portion of the through hole 313. A pin 133 disposed at the lower portion of the head slider 13 can be engaged with the projection 314. A pair of stoppers 315 and 316 which are spaced apart at equal intervals along the longitudinal direction of the drive slider 31 are formed to the right of the projection 314 extending in the through hole 313. The bending portion 276 is formed at a stem 275 of the reverse drive lever 27.

A bending portion 317 is formed between the stoppers 305 and 306 of the control slider 30 and at the lower portion of the through hole 313.

Assume that the tape is played back in the forward direction. The reverse drive lever 27 is located at the position in FIG. 3. The bending portion 276 of the reverse drive lever 27 abuts against the stopper 316 of the drive slider 31. The drive slider 31 is moved in the direction indicated by arrow F. The bending portion 317 of the drive slider 31 abuts against the stopper 306 of the control slider 30. The control slider 30 is also moved in the direction indicated by arrow F.

When the forward tape transport direction is changed to the reverse tape transport direction in the forward playback mode, the reverse drive lever 27 is pivoted in the clockwise direction as shown in FIG. 4. The bending portion 276 of the reverse drive lever 27 abuts against the stopper 315 of the drive slider 31. The drive slider 31 is then moved in the direction indicated by arrow E. The bending portion 317 of the drive slider 31 is moved between the stoppers 305 and 306 of the control slider 30 and the control slider 30 is not moved. Along with movement of the drive slider 31 in the direction indicated by arrow E, the pin 133 of the head slider 13 is moved downward along the tapered projection 314. The head slider 13 is thus moved backward in the direction indicated by arrow D when the forward tape transport direction is changed to the reverse tape transport direction.

When the reverse playback mode is initiated, the drive slider 31 is sufficiently moved in the direction indicated by arrow E in FIG. 5. The pin 133 of the head slider 13 is moved over the vertex of the projection 314 of the drive slider 31 to a position opposite to the position shown in FIG. 3. Simultaneously, the left playback slider 25 is sufficiently moved to the direction indicated by arrow C, the head slider 13 having the projection 131 engaged with the engaging portion 252 is also moved in the same direction. The pin 133 of the head slider 13 urges the projection 314 of the drive slider 31 in the opposite direction. The stopper 315 of the drive slider 31 is further moved in the direction indicated by arrow E against the urging force of the bending portion 276 of the reverse drive lever 27. The control slider 30 is also moved sufficiently in the direction indicated by arrow E upon movement of the drive slider 31.

If the user wishes to change the reverse playback mode to the forward playback mode, the reverse drive lever 27 is pivoted in the counterclockwise direction in FIG. 5. The bending portion 276 of the reverse drive lever 27 urges the stopper 316 of the drive slider 31. The drive slider 31 and the control slider 30 are moved in the direction indicated by arrow F. Thus, the state shown in FIG. 3 is restored. During this switching operation, the head slider 13 is temporarily moved backward in the direction indicated by arrow D and then advances forward.

Figure 6A:
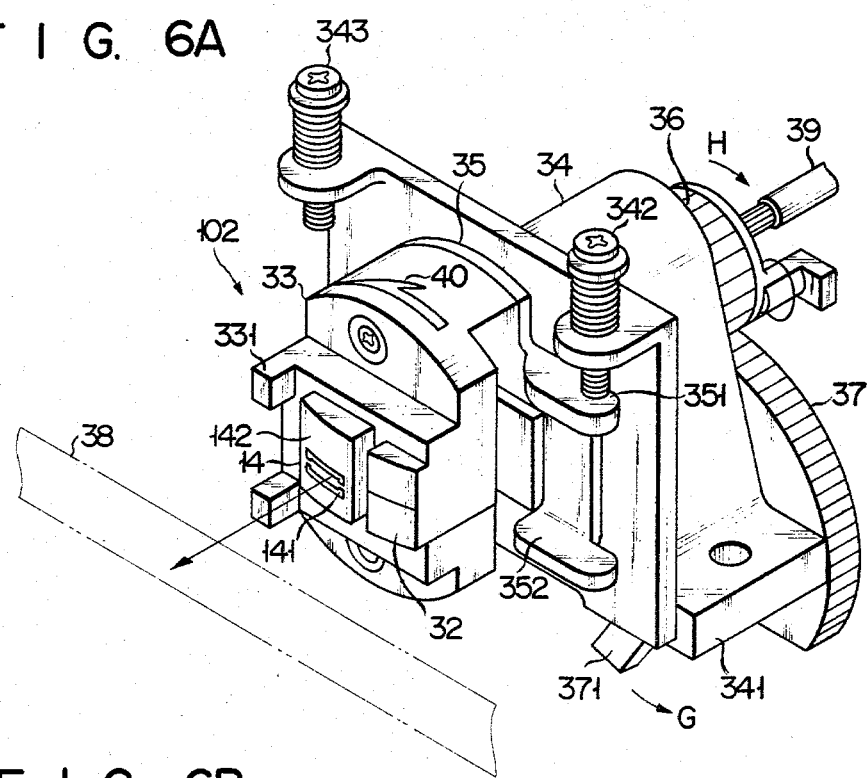

In the switching operation from the reverse playback mode to the forward playback mode or from the forward playback mode to the reverse playback mode, the drive slider 31 and the control slider 30 are moved in the directions indicated by arrows E and F, respectively, in order to drive a head rotating mechanism 102. The head rotating mechanism 102 will be described below. FIG. 6A shows the outer appearance of the schematic arrangement of the head rotating mechanism 102. The record/play head 14 for a microcassette tape recorder has a tape contact surface 142. The tape contact surface 142 has a head portion 141 for recording and reproducing the signals at one side. The record/play head 14 are disposed parallel to an erase head 32 used for a microcassette tape recorder. These heads are fitted in a substantially cylindrical head support 33.

A head mount assembly 34 coaxially integrally supports a head base plate 35 and a gear 36, as shown in FIG. 6A. A substantially sector-shaped gear 37 meshes with the gear 36. The central portion of the gear 37 is rotatably mounted on the head mount assembly 34. The head support 33 is mounted on the head base plate 35.

A mount portion 341 of the head mount assembly 34 is in contact with the head slider 13 and mounted thereon by screws or the like (not shown). The head mount assembly 34 is mounted on the head slider 13 and the tape contact surface 142 of the record/play head 14 faces upward in FIG. 3. A driven portion 371 extends from the central portion of the gear 37 and the head mount assembly 34 is mounted on the head slider 13. Simultaneously, the driven portion 371 is fitted in the fitting portion 304 of the control slider 30. Even if the head slider 13 is moved in the direction indicated by arrows C and D in FIG. 3, the driven portion 371 is not disengaged from the fitting portion 304 and is always fitted therein. When the forward playback mode is changed to the reverse playback mode or when the reverse playback mode is changed to the forward playback mode, the gear 37 pivots about the central portion upon movement of the control slider 30 in the direction indicated by arrows E and F.

Figure 6B:
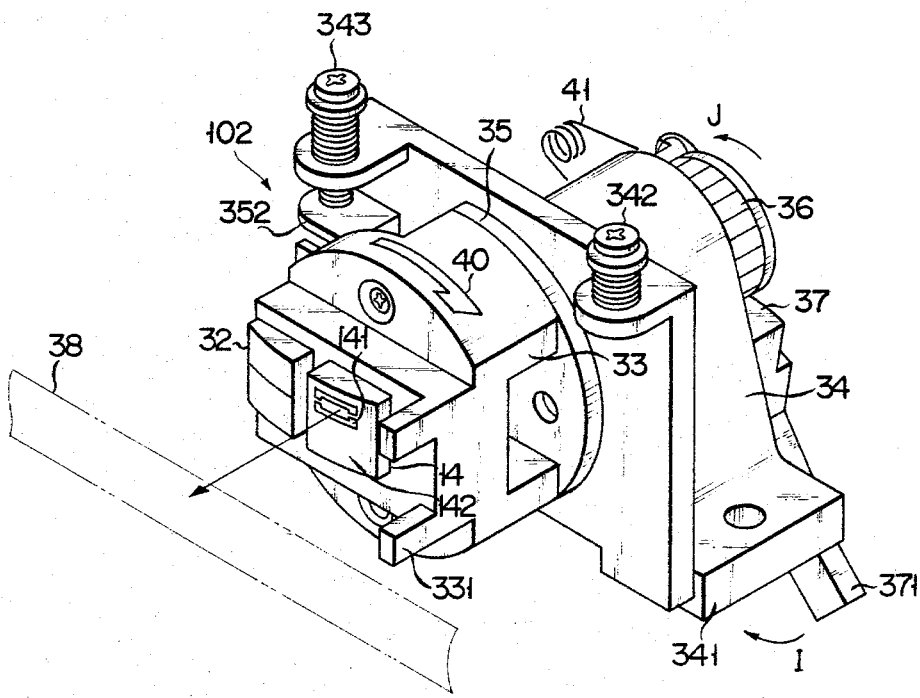

Now assume that the gear 37 is pivoted in the direction indicated by arrow G in FIG. 6A. The gear 36 meshed with the gear 37 is rotated in the direction indicated by arrow H and the head base plate 35 and the head support 33 are also rotated in the same direction. The record/play head 14 and the erase head 32 are rotated through 180° as shown in FIG. 6B. The head portion 141 faces the lower track of the tape 38 indicated by the alternate long and two short dashed line in FIG. 6A, while the head portion 141 faces the upper track of the tape 38 as shown in FIG. 6B. The head portion is moved to face a corresponding track of the tape 38 in the forward/reverse switching operation. Further, when the gear 37 is rotated in the direction indicated by arrow I in FIG. 6B, the gear 36, the head base plate 35 and the head support 33 are rotated in the direction indicated by arrow J and the record/play head 14 and the erase head 32 return to the original positions.

The record/play head 14 and the erase head 32 are inserted through head insertion holes formed in the cassette half and come in contact with the tape.

A pair of stoppers 351 and 352 extend from the parts of the head base plate 35. A pair of screws 342 and 343 are screwed at one side of the head mount assembly 34. The head base plate 35 is rotated until the stoppers 351 and 352 abut against the screws 342 and 343, respectively, as is apparent from FIGS. 6A and 6B. The screws 342 and 343 are turned to adjust the azimuth of the record/play head 14 and the erase head 32 in the conditions shown in FIGS. 6A and 6B, respectively. The record/play head 14 and the erase head 32 are electrically connected to circuit sections of the recording and reproducing systems (not shown) via a connecting wire 39 extending through the head support 33, the head base plate 35, the head mount assembly 34 and the center of the gear 36.

Arrows 40 are marked on the the periphery of the head support 33 to indicate the tape transport direction in their positions respectively shown in FIGS. 6A and 6B. A tape guide portion 331 is formed to support both sides of the tape 38 at one side of the head support 33. A torsion spring 41 shown in FIG. 6B stabilizes the head support 33 at the two positions respectively shown in FIGS. 6A and 6B. The torsion spring 41 will be described later in detail.

Figure 7:
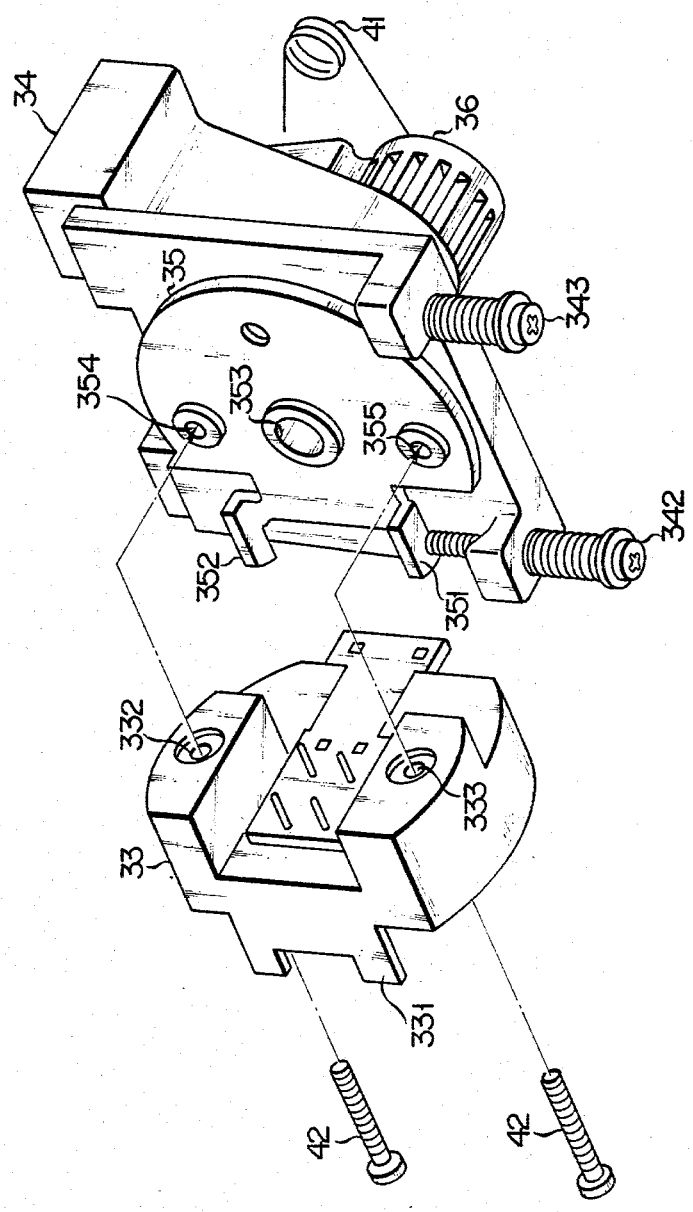
FIGS. 7 and 8 are detailed, exploded, perspective views of the head rotating mechanism, respectively.

FIG. 7 shows a detailed condition of the head support 33 mounted on the head base plate 35. Through holes 332 and 333 are formed at both ends of the central portion of the head support 33 in which the record/play head 14 and the erase head 32 are mounted. The head base plate 35 is rotatably supported on the head mount assembly 34. A through hole 353 through which the connecting wire 39 extends is formed at the center of rotation of the head base plate 35. Screw holes 354 and 355 are formed at both sides of the through hole 353 and correspond to the through holes 332 and 333 of the head support 33, respectively.

With the above arrangement, screws 42 are inserted from the tape contact surface 142 of the record/play head 14 of the head support 33 into the screw holes 354 and 355 of the head base plate 35 through the through holes 332 and 333. The head support 33 is mounted on the head base plate 35.

Figure 8:
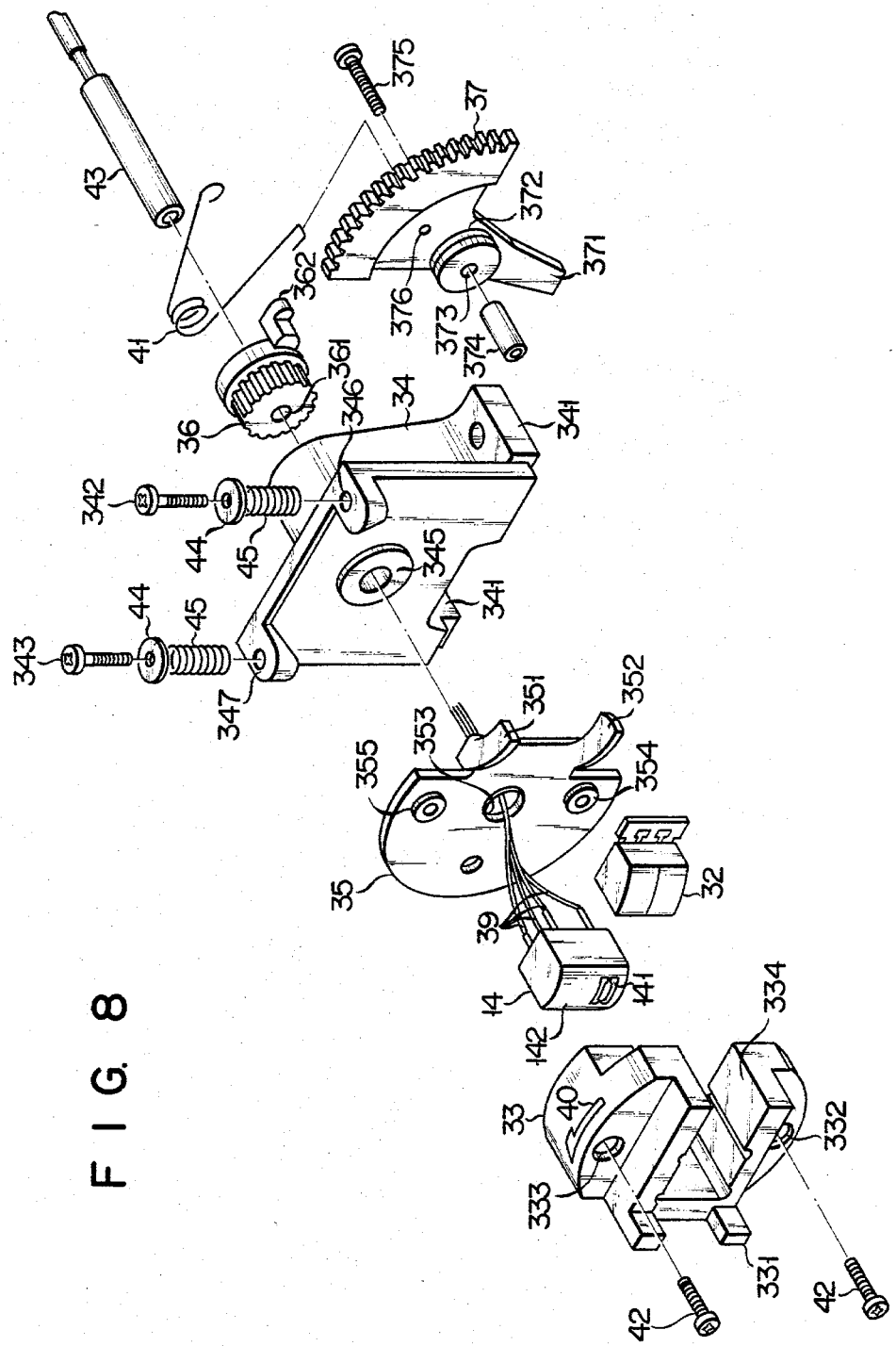

FIG. 8 is a detailed exploded perspective view of the head rotating mechanism 102. The head support 33 has a substantially cylindrical shape and a substantially concave-shaped notch 334 is formed from its periphery to substantially its center. The record/play head 14 is fitted at substantially the center of the notch 334 so as to slightly extend the tape contact surface 142 therefrom. The erase head 32 is fitted at the end portion of the notch 334 of the head support 33.

A through hole 345 is formed substantially at the center of the head mount assembly 34. A shaft 43 of substantially a cylindrical shape is loosely fitted in the through hole 345 of the head mount assembly 34. One end of the shaft 43 is fitted in the through hole 353 of the head base plate 35. The other end of the shaft 43 is fitted in the through hole 361 formed at the center of rotation of the gear 36. The head base plate 35 and the gear 36 are integrally coaxially coupled through the shaft 43 and are rotatably supported by the shaft 43. The connecting wire 39 extends through the shaft 43 and is guided outside the head rotating mechanism 102.

The screws 342 and 343 are screwed and securely fixed in the screw holes 346 and 347 of the head mount assembly 34 through plate washers 44 and coil springs 45, respectively.

Figure 9A:
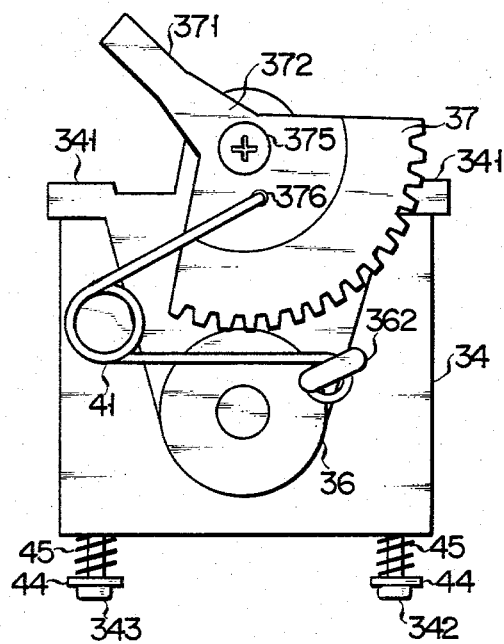
FIGS. 9A to 9C are views for explaining the arrangement and the mode of operation of a torsion spring used in the head rotating mechanism.

A through hole 373 is formed at a central portion 372 of the gear 37. A screw 375 is inserted through a spacer 374 of substantially a cylindrical shape in the through hole 373. When the screw 375 is screwed at one side of the head mount assembly 34, as shown in FIG. 9A, the gear 37 is pivotally supported on the head mount assembly 34. One end of the torsion spring 41 is engaged with the engaging portion 362 extending part of the gear 36. The other end of the torsion spring 41 is engaged with the through hole 376 formed in the vicinity of the central portion 372 of the gear 37.

The mode of operation of the torsion spring 41 which stabilizes the two positions of the head support 33 will be described. Assume that the gear 37 is located in a position indicated in FIG. 9A. The biasing force of the torsion spring 41 acts on the gear 37 to pivot it in the counterclockwise direction indicated by the arrow in FIG. 9B, while the biasing force acts on the gear 36 to rotate it in the clockwise direction. However, since the stopper 351 of the head base plate 35 which is rotated together with the gear 36 abuts against the screw 342, the gear 36 is not rotated in the clockwise direction and stably kept at the position shown in FIG. 6A.

Figure 9B:
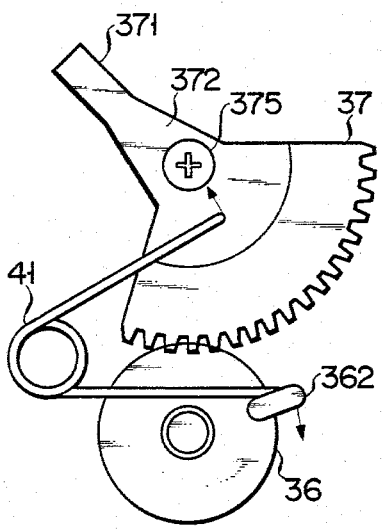
Figure 9C:
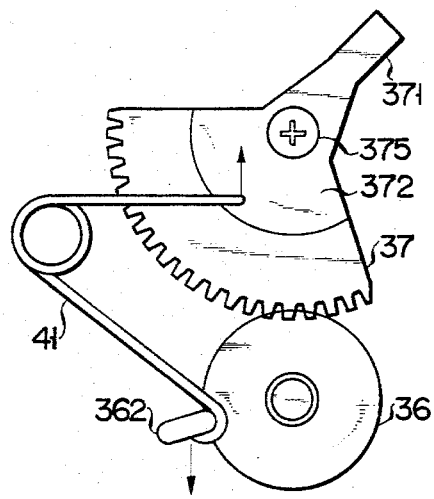
Figure 11A:
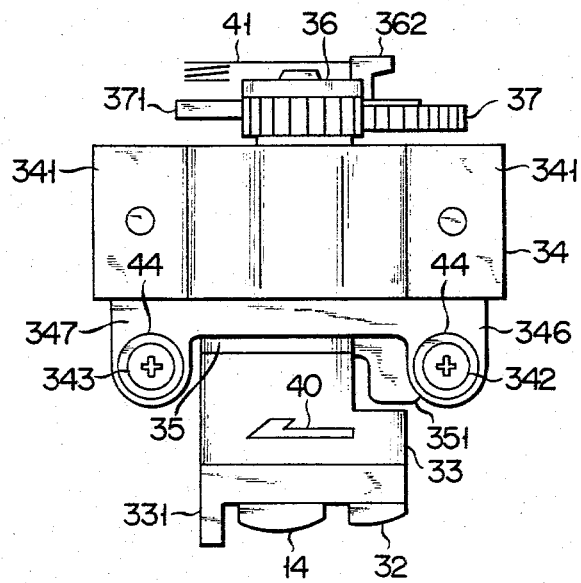
Figure 11B:
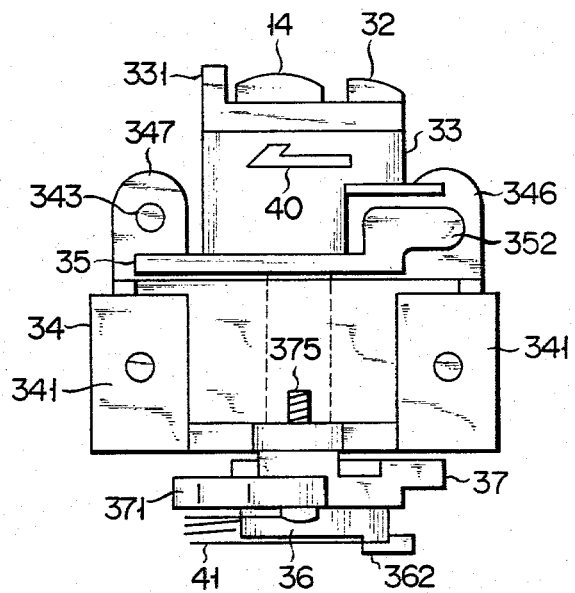

In the stable condition shown in FIG. 9B, assume that the gear 37 is pivoted in the clockwise direction against the biasing force of the torsion spring 41 by the driven portion 371 of the gear 37. Both ends of the torsion springs 41 come closer. Thereafter, when the gear 37 is pivoted to the position indicated in FIG. 9C, the torsion spring 41 causes the gear 37 to pivot in the clockwise direction as indicated by the arrow and to pivot the gear 36 in the counterclockwise direction. However, in practice, the stopper 352 of the head base plate 35 rotating together with the gear 36 abuts against the screw 343, preventing rotation of the gear 36 in the counterclockwise direction. Thus, the head support 33 is held at the position shown in FIG. 6B stably.

FIGS. 10A and 10B and FIGS. 11A and 11B respectively show the conditions of the head rotating mechanism 102 at various angles.

In the tape recorder having an automatic reverse device with the head rotating mechanism 102 described above, the record/play head 14 and the erase head 32 are rotated to always face the tape 38, as shown in FIGS. 6A and 6B. Therefore, a space for allowing movement of the head in the conventional device need not be arranged in the tape recorder mechanisms, resulting in a compact tape recorder of light weight. Further, since the head mount assembly 34 includes the head support 33, the head base plate 35, the gear 36, the gear 37 and so on, the head rotating mechanism 102 is assembled in a single unit. Therefore, mass production of the tape recorder of this type can be easily accomplished. Further, the head rotating mechanism 102 is assembled by mounting the head mount assembly 34 to the head slider 13, resulting in easy assembly.

Before the head rotating mechanism 102 is mounted on the head slider 13, that is, when the head rotating mechanism 102 is just assembled, the screws 342 and 343 need not be precisely screwed for azimuth adjustment. In other words, the screws 342 and 343 are simply screwed in the screw holes 346 and 347 since these screws only serve to contact with the stoppers 351 and 352 of the head base plate 35 so as not to rotate the gear 36 under the condition shown in FIG. 9B or 9C after assembly of the head rotating mechanism 102. When the head rotating mechanism 102 is then mounted on the head slider 13, the screws 342 and 343 are adjusted for proper azimuth of the heads. Therefore, the head rotating mechanism is further easily manufactured.

The screws 42 for coupling the head support 33 and the head base plate 35 are inserted from the side through which the record/play head 14 and the erase head 32 are exposed. In other words, the screws 42 are inserted to extend through the head rotating mechanism 102. The screw heads may not extend from the side surface of the head support 33. For this reason, the arrows 40 can be marked on the periphery of the head support 33 to indicate the tape transport direction. The space for marking the arrows 40 is guaranteed on the periphery of the head support 33 by inserting the screws 42 from the side from which the record/play head 14 and the erase head 32 of the head support 33 extend.

The arrows 40 for indicating the tape transport direction are respectively marked on the opposing peripheral portions of the head support 33 when the head support 33 is located in one of the two positions shown in FIGS. 6A and 6B. However, a means for indicating the tape transport direction is not limited to the arrows. The opposing peripheral portions respectively corresponding to the forward and reverse tape transport directions may be colored in different colors.

For example, as shown in FIG. 12A, patterns may be changed in correspondence with the normal speed forward (F) or reverse (R) mode. Similarly, various modifications may be provided, as shown in FIGS. 12B to 12F.

In the above embodiment, the arrows 40 (indicators) are marked to indicate the tape transport directions, so that a special tape transport indicator is not required, resulting in simple indication by the tape transport indicator. Since the record/play head 14 and the erase head 32 are rotated to face the tape 38, simple indicators such as the arrows 40 can be arranged.

Further, since the torsion spring 41 is used to retain the head support 33 at positions shown in FIGS. 6A and 6B, simple arrangement and easy assembly are further achieved. The torsion spring 41 is hooked between the gear 37 and the gear 36. Thus, the torsion spring 41 is one of the components of the head rotating mechanism 102 and does not prevent to arrange the head rotating mechanism 102 in a unit.

The conventional head moving mechanism couples the head assembly to the chassis by a coil spring. Even if the head assembly is mounted on the chassis, the head moving mechanism is not operated properly. The spring must be hooked between the head mechanism and the chassis.

However, since the torsion spring 41 is used in the head rotating mechanism 102 according to the present invention, as described above, the head rotating mechanism 102 as a single unit sufficiently rotates the record/play head 14 and the erase head 32 and keep them in the stable condition. Therefore, arrangement of the head rotating mechanism 102 become simple and assembling operation is efficiently performed as compared with the conventional assembling operation.

The record/play head 14 and the erase head 32 for the microcassette tape recorder are used. The head support 33 is kept in the position on one of the positions and its center of rotation is determined to insert the record/play head 14 and the erase head 32 shown in FIGS. 6A and 6B through the head insertion holes formed in the cassette half of the compact tape cassette and to bring them in contact with the tape.

When the record/play head of the microcassette tape recorder is arranged parallel to the erase head of the compact cassette tape recorder these heads can be sufficiently inserted in the head insertion hole of the compact cassette half. The erase head 32 may be replaced with the erase head for the compact cassette tape recorder. In this case, the center of rotation of the head support 33 is determined so as to insert the record/play head and the erase head through the head insertion hole in consideration of both head rotating positions.

In the forward and reverse playback (recording) mode with the automatic reverse function, only one record/play head 14 and one erase head 32 are needed, resulting in simple construction and economy. In the tape recorder having the conventional automatic reverse function, the record/play head is movable and a pair of erase heads are disposed in positions corresponding to a pair of erase head insertion holes, resulting in complex structure and economical disadvantages. When the record/play head 14 and the erase head 32 can be inserted in the head insertion hole of the compact cassette half, one record/play head 14 and one erase head 32 are required, resulting in structural convenience and economy. At the same time, the record/play head 14 and the erase head 32 need not be electrically switched.

Further, since the record/play head 14 and the erase head 32 are mounted on the same head support 33, the swing angle, the relative gap between the heads, and the position of the heads relative to the head support can be easily adjusted and heat dissipating effects are improved.

A combination head having the record head and the play head which are arranged parallel to each other as the record/play head 14 may be used. The record head RH, the play head PH and the erase head EH are mounted in the head support 33 shown in FIG. 6C. The head support 33 is arranged to be rotated so that these heads are inserted in the head insertion hole of the compact cassette half.

FIG. 13 shows the positional relation of the record/play head 14 and the tape 38 in a cassette half 46 of the compact tape cassette. It is known that a pair of tape guide rollers 47 and a pair of tape guide pins 48 are disposed in the cassette half 46. A tape pad 49 is supported by a leaf spring 50 substantially at the center of the cassette half 46. Capstan insertion holes 461 and 462 in which the capstans 17 and 18 are inserted are formed at predetermined positions of the cassette half 46, respectively. Further, guide pin insertion holes 463 and 464 into which guide pins (not shown) projecting from the main chassis 11 extend, head insertion hole 465, erase head insertion holes 466 and 467, and pinch roller insertion holes 468 and 469 into which the pinch rollers 15 and 16 are respectively inserted are formed in the predetermined positions in the cassette half 46.

As shown in FIG. 13, the record/play head 14 and the erase head 32 are inserted together into the head insertion hole 465 of the cassette half 46 and come in contact with the tape 38. A pair of tape guides 51 mounted at both sides of the head rotating mechanism 102 of the head slider 13 are fitted in the erase head insertion holes 466 and 467 of the cassette half 46.

Assume that the pinch roller 16 is in tight contact with the capstan 18 through the tape 38 and the tape 38 is driven in the forward direction indicated by arrow K. A line ii perpendicular to the vertex of the record/play head 14 is deviated by a predetermined distance $\alpha$ from the central line of the head insertion hole 465, that is, from the perpendicular bisector i connecting the axes of the capstans 17 and 18 in the tape drive direction. The perpendicular bisector i corresponds to the center of the tape pad 49 and the cassette half 46. The distance in practice is about 0.5 mm.

When the line ii from the vertex of the record/play head 14 is deviated by the distance $\alpha$ from the perpendicular bisector i, the following effects are obtained. The leaf spring 50 mounted on the tape pad 49 is loosely supported in the cassette half 46. The leaf spring 50 is loosely supported in the longitudinal direction of the tape 38. When the tape 38 is driven in the direction indicated by arrow K, the leaf spring 50 is also moved in the same direction due to friction between the tape pad 49 and the tape 38 until the end of the leaf spring 50 abuts against the wall. The center of the tape pad 49 is slightly deviated to the right from the perpendicular bisector i.

When the vertex of the record/play head 14 is deviated by the distance from the center of the pad 49 (cassette half 46), the central portion of the tape pad 49 comes in contact with the vertex of the record/play head 14 when the tape 38 is driven in the direction indicated by arrow K. Thus, the tape 38 is stably and sufficiently in contact with the record/play head 14 by the tape pad 49, resulting in excellent recording and reproducing. When the tape 38 is driven in the reverse direction, the same effect is obtained. Assume that the pinch roller 15 comes in tight contact with the capstan 17 through the tape 38, that the head support 33 orients in the direction opposite to the direction shown in FIG. 13 and that the tape 38 is driven in the direction indicated by the arrow L. The line i perpendicular to the vertex of the record/play head 14 is deviated from the perpendicular bisector ii by the distance $\alpha$ in the left direction. The tape pad 49 is also slightly moved in the same direction upon travelling of the tape 38 in the direction indicated by arrow L. As a result, the same results as described above are obtained.

Figure 14A:
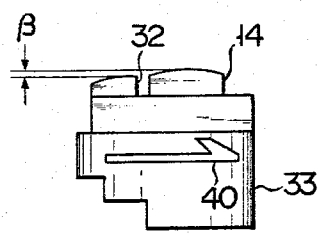
FIGS. 14A to 14C are views for explaining the relation between the levels of the record/play head and the erase head and its effects.

As shown in FIG. 14A, the vertex of the erase head 32 is disposed at a position lower than that of the record/play head 14 by a distance $\beta$. The distance $\beta$ is actually about 0.2 mm. With this difference, the following effects are obtained.

Figure 14B:
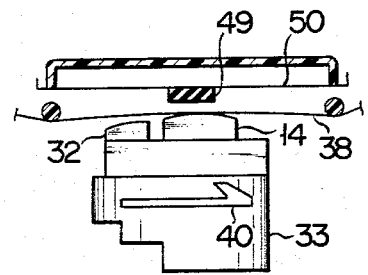

It is known that the tape 38 may be driven at a high speed in slightly contact with the record/play head 14 to provide a means for detecting blank portions between songs and playing back from the beginning of a desired song for a special cuing operation. Since the height of the erase head 32 is lower than that of the record/play head 14, the tape 38 comes in contact with only the top of the record/play head 14 as shown in FIG. 14B. The tape 38 is not in contact with the erase head portion, thus preventing an excessive load on the tape 38 and accomplishing cuing operation effectively. The arrangement of the record/play head and the erase head is conveniently used in the normal cue and review modes.

Figure 14C:
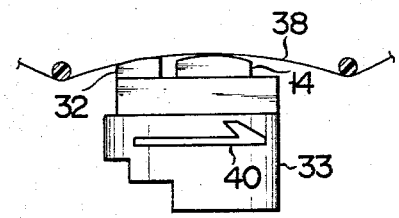

Further, as shown in FIG. 14C, even when the normal playback and recording are performed, the tape 38 comes in complete contact with the record/play head 14 and the erase head 32, thus preventing degradation of recording and reproducing characteristics of the signals.

Figure 15:
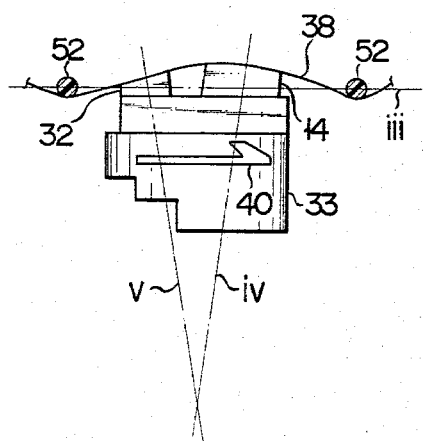
FIGS. 15 to 17 are views illustrating the mounting conditions of the record/play head and the erase head.

In order to attain sufficient contact of the tape 38 with the record/play head 14 and the erase head 32, a means shown in FIG. 15 is used. As described above with reference to FIG. 13, substantially columnar-shaped guide portions 52 are formed to guide the tape 38 to the both ends of the head insertion hole 465. As shown in FIG. 15, during the recording and reproducing operations, the tape 38 located in the guide portions 52 is urged by the record/play head 14 and the erase head 32 to have substantially an arcuated shape. Thus, recording and reproduction are performed. The tape contact surfaces of the record/play head 14 and the erase head 32 extend upward in the figure from a line iii connecting the centers of the both guide portions 52. The tape contact surfaces of the record/play head 14 and the erase head 32 extend in the direction in which these heads 14 and 32 cause the tape 38 to abut against the guide portions 52.

The tape 38, therefore, extends upward in the figure from the line iii in a substantially arcuated shape. The heights of the record/play head 14 and the erase head 32 are determined so as to define the vertex of the arc of the tape 38. Simultaneously, a central line iv of the arcuated surface of the record/play head 14 which contacts with the tape 38 and a central line v of the arcuated surface of the erase head 32 which contacts with the tape 38 cross each other at the side opposite to the side in which the tape extends in an arcuated shape, that is, at the side below the line iii.

The mounting conditions of the record/play head 14 and the erase head 32 are set as described above. Thus, the tape 38 comes in contact with the record/play head 14 and the erase head 32 properly in a very simple arrangement.

Figure 16:
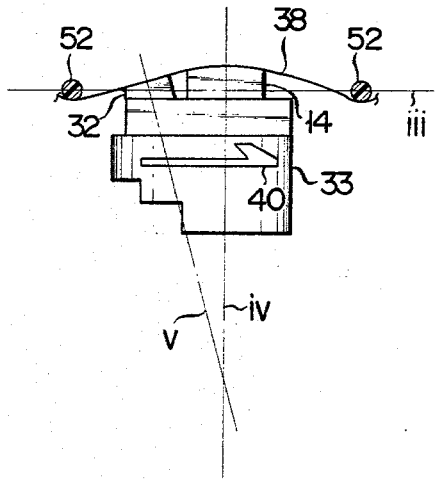
Figure 17:
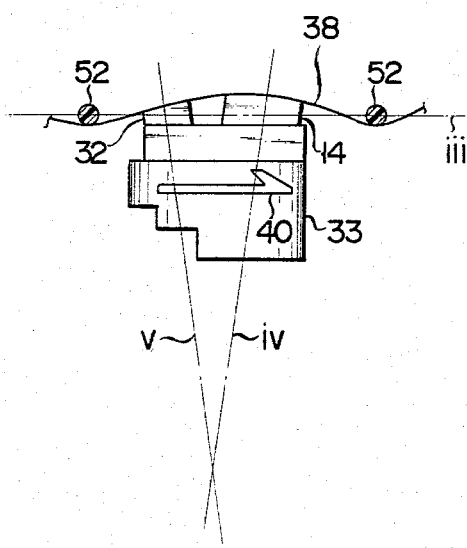

FIGS. 16 and 17 show modifications for mounting heads shown in FIG. 15.

The guide portions 52 may be the capstans 17 and 18.

What is claimed is:

1. A tape recorder, comprising:
   a head chassis;
   a head mount assembly, fixed to said head chassis, having a surface parallel with a plane in which a tape running on said tape recorder would run, and provided with a through-hole about a central portion thereof, said through-hole extending in a direction perpendicular to said surface of said head mount assembly;

a shaft rotatably inserted through the through-hole of the head mount assembly;

head base plate having one surface parallel with the surface of the head mount assembly and the other surface providing a mounting surface, the central portion of the head base plate being fixed to the edge of the shaft such that the head base plate is rotatably together with the shaft in parallel with the surface of the head mount assembly;

a record/play head and an erase head each having a surface which abuts against the tape;

a head support for supporting the record/play head and the erase head, the record/play head being supported such that the tape-abutting surface of the record/play head is exposed to the outer surface of said head support, the erase head being supported at a position outside the record/play head such that the tape-abutting surface of the erase head is exposed to the outer surface of said head support; and switching means for selectively running the tape at a constant speed in the forward and reverse directions, the shaft rotatably inserted into the through-hole of the head mount assembly being interlocked with the switching means to move the record/play head and erase head to the positions where the tape running in the forward or reverse direction at a constant speed abuts against said heads.

2. A tape recorder according to claim 1, wherein said head support of a substantially columnar shape has a notch formed to extend from a peripheral portion to a central portion thereof, said record/play head is fitted in a portion near the central portion of said notch and said erase head is fitted in a portion near the peripheral portion thereof.

3. A tape recorder according to claim 1 further comprising a pair of stoppers for stopping a rotation of the head support.

4. A tape recorder according to claim 1 wherein said head base plate has projecting portions defining holes which engage recessed portions around through-holes of said head support so as to control the relative positions of the head base plate and head support.

5. A tape recorder according to claim 1 wherein said head support has projecting portions defining holes which engage recessed portions around through-holes of said head base plate so as to control the relative positions of the head base plate and head support.

6. A tape recorder according to claim 1 further comprising a fixing member inserted from the outer surface of said head support for fixing the head support to said head base plate.

* * * * *